(12) United States Patent
Tashiro

(10) Patent No.: US 9,789,856 B2
(45) Date of Patent: Oct. 17, 2017

(54) PARKING LOCK-RELEASING DEVICE FOR VEHICLE

(71) Applicant: HONDA MOTOR CO., LTD., Tokyo (JP)

(72) Inventor: Norihiko Tashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 14/691,287

(22) Filed: Apr. 20, 2015

(65) Prior Publication Data

US 2015/0298663 A1  Oct. 22, 2015

(30) Foreign Application Priority Data

Apr. 21, 2014  (JP) ................. 2014-087719

(51) Int. Cl.
| | | |
|---|---|---|
| *F16D 65/14* | (2006.01) | |
| *B60T 7/10* | (2006.01) | |
| *B60T 7/04* | (2006.01) | |
| *F16H 63/34* | (2006.01) | |
| *F16D 121/16* | (2012.01) | |
| *F16D 127/04* | (2012.01) | |
| *B60T 1/00* | (2006.01) | |

(52) U.S. Cl.
CPC ............. *B60T 7/104* (2013.01); *B60T 7/047* (2013.01); *F16H 63/3416* (2013.01);
(Continued)

(58) Field of Classification Search
CPC .......... Y10T 74/2042; Y10T 74/20426; Y10T 74/2045; Y10T 74/20462; F16D 2127/04; F16D 2121/16; B60T 7/047
(Continued)

(56) References Cited

U.S. PATENT DOCUMENTS

| | | | | |
|---|---|---|---|---|
| 5,638,722 A | * | 6/1997 | Klingler ................. | A47C 7/462 |
| | | | | 297/374 |
| 6,053,064 A | * | 4/2000 | Gowing .................... | F16C 1/16 |
| | | | | 29/453 |

(Continued)

FOREIGN PATENT DOCUMENTS

| | | |
|---|---|---|
| JP | 5008616 B2 | 8/2012 |
| JP | 2013-170699 A | 9/2013 |

OTHER PUBLICATIONS

Machine translation of JP 5008616 (no date).*

(Continued)

*Primary Examiner* — Nicholas J Lane
(74) *Attorney, Agent, or Firm* — Westerman, Hattori, Daniels & Adrian, LLP

(57) ABSTRACT

A parking lock-releasing device for a vehicle, which is capable of improving workability in manually releasing a parking lock while ensuring sealing performance of an outer casing, and easily holding the locking released state. The locking release operation section includes a base having a hollow cylindrical guide portion and concentrically continuous with a front end of the outer casing, with a female screw formed on an inner peripheral surface thereof, and an operating section body which is screwed via a male screw formed on an outer peripheral surface thereof into the female screw of the guide portion, closes the guide portion, holds a front end of the inner cable, and when releasing the locking, is rotatingly operated in a predetermined direction relative to the base, to thereby cause the inner cable to slide to be pulled in the direction away from the parking mechanism.

5 Claims, 10 Drawing Sheets

(52) U.S. Cl.
CPC .......... *F16H 63/3491* (2013.01); *B60T 1/005* (2013.01); *F16D 2121/16* (2013.01); *F16D 2127/04* (2013.01)

(58) Field of Classification Search
USPC ...................................................... 74/501.6
See application file for complete search history.

(56) References Cited

U.S. PATENT DOCUMENTS

| | | | | |
|---|---|---|---|---|
| 6,179,108 | B1 * | 1/2001 | Gierer | F16H 63/48 |
| | | | | 192/218 |
| 6,668,679 | B2 * | 12/2003 | McMillen | B60N 2/66 |
| | | | | 187/251 |
| 7,131,694 | B1 * | 11/2006 | Buffa | B60N 2/66 |
| | | | | 297/284.4 |
| 7,494,183 | B2 * | 2/2009 | Liu | B60N 2/443 |
| | | | | 29/428 |
| 2005/0011299 | A1 * | 1/2005 | MacAulay | B60N 2/66 |
| | | | | 74/502 |

OTHER PUBLICATIONS

Abstract for KR 2009/0039056 (Apr. 2009).*
Machine Translation of JP 2013-170699 (no date).*
Office Action dated Dec. 20, 2016, issued in counterpart Japanese application No. 2014-087719. (4 pages).

* cited by examiner

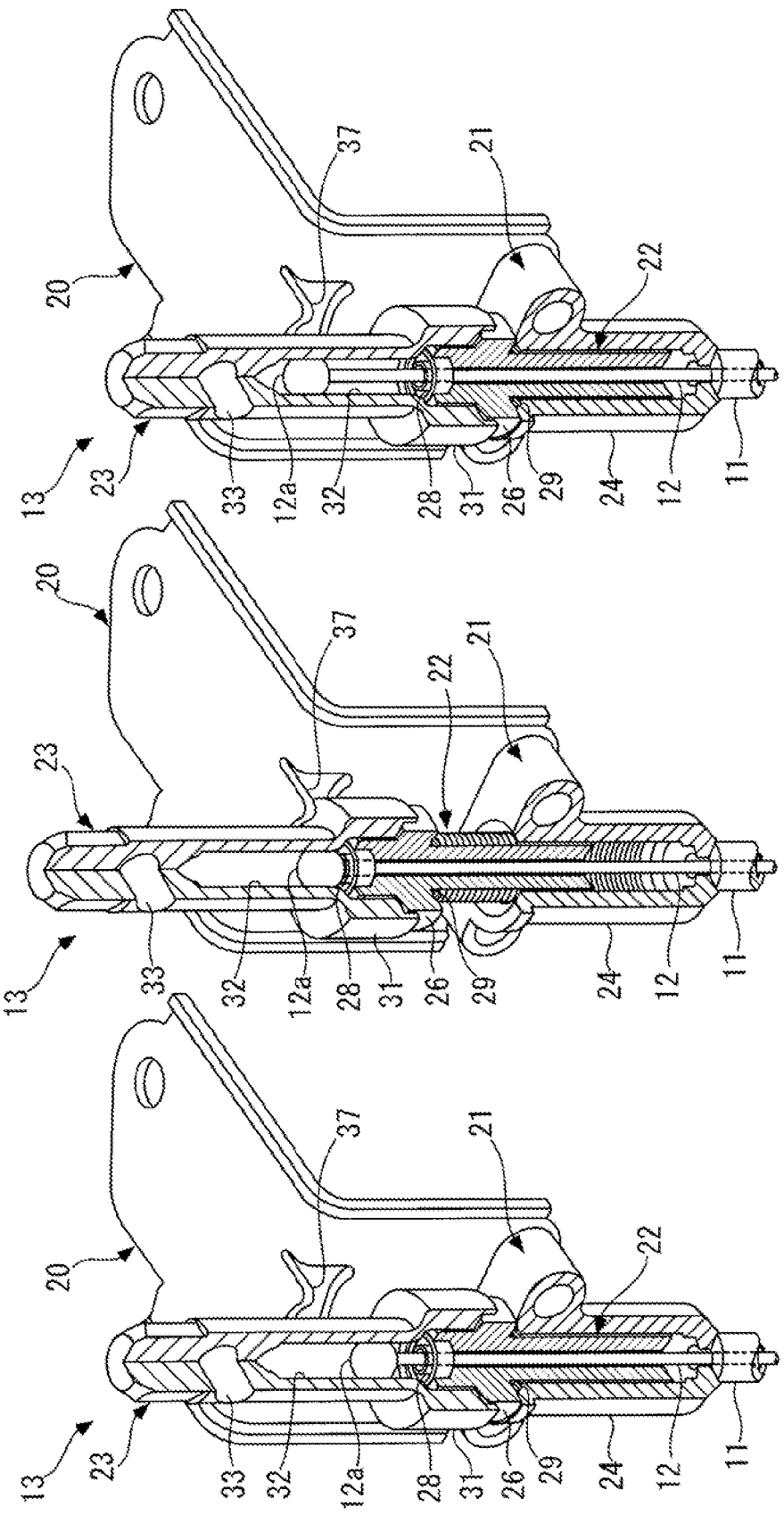

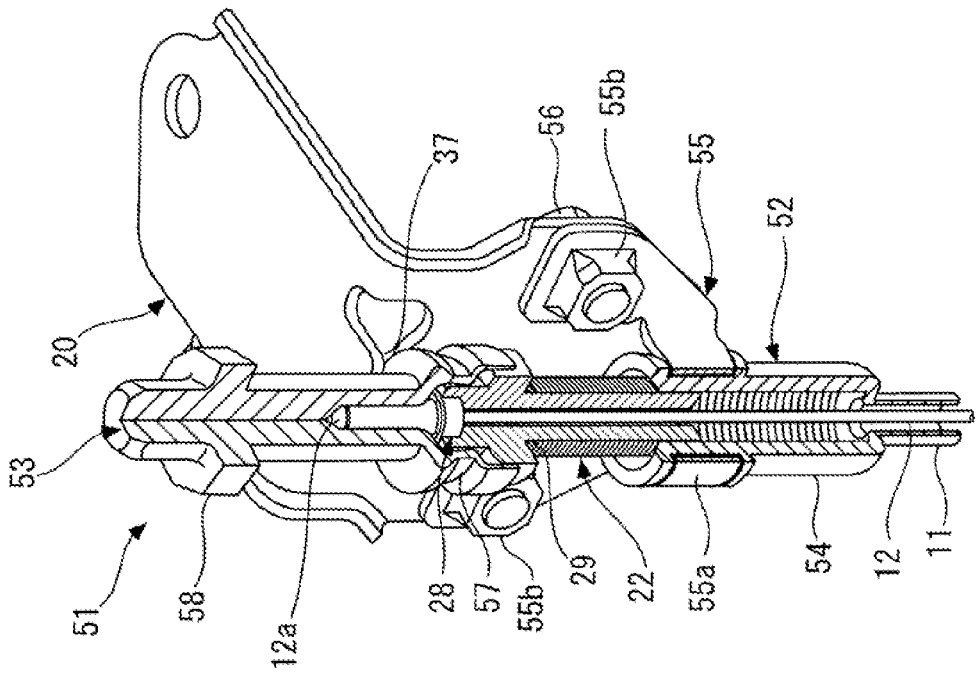
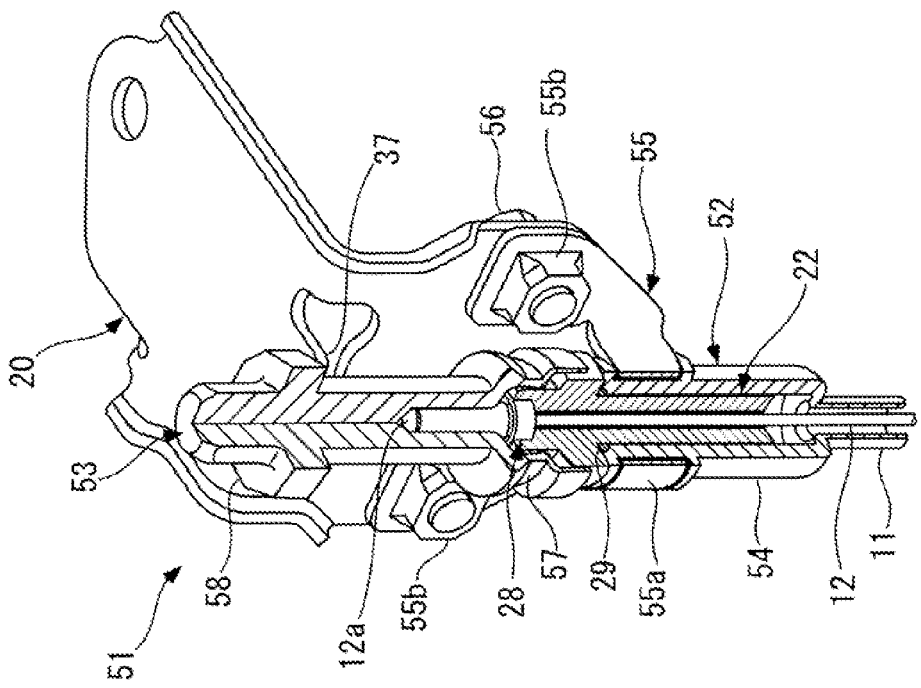

PARKING LOCK-RELEASING DEVICE FOR VEHICLE

BACKGROUND OF THE INVENTION

Field of the Invention

The present invention relates to a parking lock-releasing device for a vehicle in which a parking mechanism actuated by an electric or hydraulic actuator unrotatably locks an output shaft of a transmission when a shift range is switched to a parking range. The lock-releasing device is for manually releasing the locking by the parking mechanism when the actuator is in an inoperable state with the shift range having been switched to the parking range.

Description of the Related Art

Conventionally, as a parking lock-releasing device for a vehicle, there has been proposed one disclosed in Japanese Patent No. 5008616 filed by the present applicant and has already been allowed. The vehicle having the parking lock-releasing device includes a shift lever that is operated when the shift range is switched, an actuator for actuating a transmission according to the operation of the shift lever, and a controller that is disposed between the shift lever and the actuator for transmitting and receiving electrical signals to and from the shift lever and the actuator to control the transmission. The vehicle has a so-called shift-by-wire system applied thereto for switching the shift range via a communication line. When the shift lever is operated by a driver of the vehicle, an electrical signal corresponding to the operation of the shift lever is transmitted to the actuator via the controller, and the actuator switches the transmission to a desired range.

In the vehicle to which is applied the shift-by-wire system, there is a fear that when the actuator becomes inoperable due to battery exhaustion which makes it impossible to supply power to the actuator or due to a failure of the actuator itself, the shift range of the transmission becomes incapable of being switched. In particular, when the shift range is in the parking range, normally, the output shaft of the transmission has been unrotatably locked (subjected to parking lock) by the parking mechanism, and hence it is impossible to move the vehicle in spite of an attempt to move the vehicle e.g. by traction. To cope with this inconvenience, the vehicle as described above is provided with a parking lock-releasing device for manually releasing the locking by the parking mechanism.

The parking lock-releasing device includes an long slender cylindrical outer casing, an inner cable which is slidably accommodated in the outer casing and has one end connected to the shift lever of the transmission and the other end (hereinafter referred to as "the front end") positioned at or close to an end (front end) of the outer casing on a side remote from the transmission, and a cap which is provided at the front end of the outer casing for water-tightly sealing the front end at normal times and is connected to the front end of the inner cable when the parking lock is released. The front end of the outer casing is provided with an outer casing terminal member (hereinafter referred to as "the outer terminal member") which is formed in a hollow cylindrical shape for having the front end of the inner cable inserted therein and has a female screw on an inner peripheral surface thereof. On the other hand, the front end of the inner cable is provided with an inner cable terminal member (hereinafter referred to as "the inner terminal member") which is formed in a columnar shape and has a male screw on an outer peripheral surface thereof. Further, the cap is formed in a hollow shape which extends like a bar over a predetermined length and has one end which is open. The one end has a male screw formed on an outer peripheral surface thereof for screwing into the female screw of the outer terminal member, and the other end of the cap has a female screw formed thereon which can be screwed onto the male screw of the inner terminal member. Therefore, at normal times, the cap is connected to the inner cable in a state screwed into the outer terminal member, whereby water is prevented from entering the interior of the outer casing so as to prevent the inner cable from suffering from rust and like damage. Further, the inner terminal member of the front end is slidable within the cap along with sliding of the inner cable when the shift range is switched by the actuator. Note that a front end of the cap which is the above-mentioned other end has a cover removably mounted thereon for preventing the female screw from suffering from rust and like damage.

In the lock releasing device constructed as above, the locking by the parking mechanism is released as follows. First, the cover is removed from the front end of the cap, and the cap is rotated in a predetermined direction and is thereby removed from the outer terminal member. This opens the front end of the outer terminal member to thereby expose the inner terminal member as the front end of the inner cable to the outside. Next, the cap is reversed, and the female screw of the front end thereof is screwed onto the male screw of the inner terminal member, whereby the cap is connected to the inner terminal member in a state screwed thereon. Then, the cap is pulled by a predetermined stroke, whereby the shift lever of the transmission is actuated via the inner cable to thereby release the parking lock.

As described above, in the conventional lock releasing device, when releasing the lock, the operator has to remove the cap from the outer terminal member by rotating the cap, and further, after reversing the cap, screw the cap onto the inner terminal member to thereby connect the former to the latter. These operations before pulling the inner cable to release the parking lock are troublesome. Further, the parking mechanism is generally configured to operate in a locking direction by the urging force of a spring or the like, and hence the operator needs to hold the inner cable in a pulled state to maintain the locking by the parking mechanism in a released state. That is, the operator has to hold the cap in the state pulled by the predetermined stroke against the urging force of the parking mechanism, and if the operator releases the hand from the cap, the locking by the parking mechanism is performed again. Thus, the above-described lock releasing device leaves room for improvement in workability in releasing the locking by the parking mechanism.

SUMMARY OF THE INVENTION

It is an object of the present invention to provide a parking lock-releasing device for a vehicle, which is capable of improving workability in manually releasing a parking lock while ensuring the sealing performance of a front end of an outer casing, and is capable of easily holding a locking released state.

To attain the above object, the present invention provides a parking lock-releasing device for a vehicle in which a parking mechanism actuated by an electric or hydraulic actuator unrotatably locks an output shaft of a transmission, the parking lock-releasing device being for manually releasing locking by the parking mechanism, including an outer casing having a long slender hollow cylindrical shape, an inner cable accommodated in the outer casing such that the inner cable extends along a direction of length of the outer casing in a slidable manner, one end of the inner cable being engaged with the parking mechanism, and a locking release operation section provided at a front end that is an end of the outer casing remote from the parking mechanism, for pulling the inner cable in a direction opposite to a direction toward the parking mechanism when manually releasing the locking, wherein the locking release operation section comprises a base that has a guide portion having a hollow cylindrical shape and concentrically continuous with the front end of the outer casing, the guide portion having a female screw formed on an inner peripheral surface thereof, and an operating section body that is screwed via a male screw formed on an outer peripheral surface thereof into the female screw of the guide portion and also closes the guide portion, the operating section body holding another end of the inner cable, and when releasing the locking, being rotatingly operated in a predetermined direction relative to the base, to thereby cause the inner cable to slide such that the inner cable is pulled in the direction opposite to the direction toward the parking mechanism.

According to the arrangement of this parking lock-releasing device, one end of the inner cable accommodated in the outer casing having a long slender hollow cylindrical shape such that it extends along the direction of length of the outer casing in a slidable manner is connected to a parking mechanism. Further, the locking release operation section is provided at a front end of the outer casing which is an end remote from the parking mechanism, for pulling the inner cable. The locking release operation section includes a base having a hollowing cylindrical guide portion which is concentrically continuous with the front end of the outer casing, and an operating section body which is operated when releasing the parking lock. A guide portion of the base has a female screw formed on an inner peripheral surface thereof, and on the other hand, the operating section body has a male screw formed on an outer peripheral surface thereof, for screwing into the female screw of the guide portion. Then, by screwing the operating section body into the guide portion, the guide portion is closed, and the operating section body holds the other end of the inner cable. Thus, the operating section body closes the guide portion, continuous with the end of the outer casing, of the base, in a state screwed into the guide portion, and hence it is possible to ensure sealing performance of the front end of the outer casing. This makes it possible to prevent water from entering the interior of the outer casing and effectively prevent the inner cable from suffering from rust and like damage.

Further, when releasing the locking by the parking mechanism, the operator rotatingly operates the operating section body of the locking release operation section in a predetermined direction (direction opposite to a screw-in direction) relative to the base to thereby cause the operating section body to be withdrawn by a predetermined stroke. This causes the inner cable to slide by the predetermined stroke while being pulled in a direction away from the parking mechanism, so that the parking lock is released. Thus, when releasing the parking lock, it is only required to rotatingly operate the operating section body in the predetermined direction, and hence it is possible to more easily release the parking lock compared with the conventional device.

Further, in this case, even when the inner cable is pulled toward the parking mechanism due to the conventional arrangement of the parking mechanism in which the parking mechanism operates in a locking direction by the urging force of a spring or the like, similarly to the general type described hereinabove, the operating section body screwed into the guide portion of the base does not move back and forth unless the operating section body is rotatingly operated, which makes it possible to easily maintain the parking mechanism in a locking released state even after the operator releases the hand from the operating section body. As described above, according to the present invention, it is possible to improve workability in manually releasing the parking lock while ensuring sealing performance of the front end of the outer casing and easily maintain the locking released state.

Preferably, the operating section body includes a cable holder configured to extend concentrically with the guide portion over a predetermined length, and hold the other end of the inner cable in a state inserted in a through hole which extends along a direction of length of the cable holder, the cable holder having the male screw formed on an outer peripheral surface thereof, and a cover attached to the cable holder, in a state covering the front end of the cable holder and the other end of the inner cable.

With the arrangement of the preferred embodiment, the cable holder is configured to extend concentrically with the guide portion of the base over a predetermined length, and is provided with a through hole which extends along the direction of the length of the cable holder. Further, the other end of the inner cable is held in a state inserted into the through hole of the cable holder, and the cover is attached to the cable holder in a state covering the front end of the cable holder and the other end of the inner cable. When releasing the parking lock, by rotatingly operating the cable holder in a direction opposite to the screw-in direction, it is possible to easily cause the inner cable to slide the other end of which is held by the cable holder, in a manner pulled to a direction away from the parking mechanism. Further, the front end of the cable holder and the other end of the inner cable are covered by the cover attached to the cable holder, and hence it is possible to positively prevent water from entering the through hole of the cable holder and from attaching to the other end of the inner cable.

More preferably, an extremity of the other end of the inner cable is provided with an increased-diameter portion having a larger diameter than a diameter of the through hole of the cable holder, and the operating section body further includes a relative rotation holding section provided between the cable holder and the increased-diameter portion of the inner cable, for holding the cable holder and the inner cable in a state rotatable relative to each other.

With the arrangement of the preferred embodiment, the relative rotation holding section for holding the cable holder and the inner cable in the state rotatable relative to each other is provided between the cable holder and the increased-diameter portion formed at the extremity of the other end of the inner cable. Therefore, to release the parking lock, even when the cable holder is rotatingly operated, the inner cable is not rotated together with the cable holder, which makes it possible to prevent the inner cable from being twisted.

Further preferably, the cover is configured to extend outward from the cable holder over a predetermined length concentrically with the cable holder, and includes a hollow portion which allows movement of the increased-diameter portion when the inner cable is slid along with actuation of the parking mechanism by the actuator.

With the arrangement of the preferred embodiment, the cover is configured to extend outward over a predetermined length concentrically with the cable holder, and includes a hollow portion that allows movement of the increased-diameter portion of the inner cable. Therefore, even when the inner cable is slid as the parking mechanism is actuated by the actuator, it is possible to cause the inner cable to smoothly slide without being compressed or deflected.

Even more preferably, the cover is attached to the cable holder in a relatively unrotatable state, and the cover is provided with a tool insertion hole extending through the cover in a direction orthogonal to a direction of length of the cover, for rotatingly operating the cable holder in unison with the cover, in a state having the tool inserted therein.

With the arrangement of the preferred embodiment, the cover is attached to the cable holder in a relatively unrotatable manner, and is provided with a tool insertion hole extending through the cover in the direction orthogonal to the direction of length of the cover. This makes it possible, when releasing the parking lock, to insert a suitable tool, such as a screwdriver, to the tool insertion hole, and easily rotatingly operate the cable holder in unison with the cover.

Preferably, the locking release operation section further comprises a stopper for disabling rotating operation of the operating section body by abutment of the operating section body against the stopper when the operating section body is pulled out while being rotated by a predetermined stroke with respect to the base.

With the arrangement of the preferred embodiment, when the operating section body is pulled out while being rotated by a predetermined stroke with respect to the base, causing the operating section body to abut against the stopper, the operating section body cannot be further rotated. By providing the stopper in a manner well positioned enough to release the parking lock by rotating operation of the operating section body, the operator can positively release the parking lock by rotatingly operate the operating section body until it abuts against the stopper. Further, after releasing the parking lock, when the releasing of the parking lock becomes unnecessary, it is possible to easily bring the operating section body into the original position, i.e. the position in which locking is performed by the parking mechanism, by rotatingly operating the operating section body in a direction opposite to the direction for releasing the locking.

Preferably, the parking mechanism includes a lock lever provided, outside the transmission, in a manner extending like an arm from a base portion, the lock lever being configured to be pivotally movable using the base portion as a fulcrum, between a locking position to be positioned at the time of the locking and a locking release position at which the locking is released, and the one end of the inner cable is provided with a lever engagement portion which can be engaged with and disengaged from a front end of the lock lever. The lever engagement portion is configured to be engaged with the lock lever in the locking position, and be linearly moved between a standby position in which the lever engagement portion is on standby in a state in which the locking release operation section is not operated, and a lever actuating position in which the lever engagement portion actuates the lock lever to the locking release position by the locking release operation section being operated.

With the arrangement of the preferred embodiment, the lock lever is provided outside the transmission, for operating the parking mechanism. The lock lever extends like an arm from the base part, and is configured to be pivotally movable between the locking position and the locking release position, using the base portion as a fulcrum. Further, the one end of the inner cable, i.e. an end of the same toward the parking mechanism, is provided with the lever engagement portion which can be engaged with and disengaged from the front end of the lock lever. The lever engagement portion is configured to be linearly moved between the standby position and the lever actuating position. That is, the lever engagement portion is in the standby position when the locking release operation section is not operated, and is engaged with the lock lever when the lock lever is in the locking position. On the other hand, when releasing the locking, the locking release operation section is operated to thereby cause the lever engagement portion to be moved toward the lever actuating position by pulling of the inner cable in a direction away from the parking mechanism. This actuates the lock lever from the locking position to the locking release position, whereby the locking is released.

Further, when the lever engagement portion of the inner cable is in the standby position, in a case where the lock lever is pivotally moved from the locking position to the locking release position as the parking mechanism is actuated by the actuator, the lever engagement portion remains in the standby position since the locking release operation section is not operated, so that the lock lever leaves the lever engagement portion. In other words, even when the parking mechanism is actuated by the actuator, the inner cable is not slid inside the outer casing. With the parking lock-releasing device arranged as described above, compared with a case where whenever the parking mechanism performs locking and releasing the locking, the inner cable is slid inside the outer casing according to the locking and the releasing by the parking mechanism, it is possible to prolong the service life of the present device and stably use the same. Further, when the actuator actuates the parking mechanism, power for sliding the inner cable is not required and load due to the sliding does not act on the actuator, and hence compared with a case where the inner cable is always connected to the parking mechanism, it is possible to reduce actuating force of the actuator on the parking mechanism, and ensure positive and stable operations of the actuator.

The above and other objects, features, and advantages of the present invention will become more apparent from the following detailed description taken in conjunction with the accompanying drawings.

BRIEF DESCRIPTION OF THE DRAWINGS

FIGS. 6A to 6C are views which are useful in explaining the operation of the locking release operation section, in which FIG. 6A shows a state before the locking is released, FIG. 6B shows a state after the locking is released, and FIG. 6C shows an operating state of the inner cable when the actuator releases the locking by the parking mechanism;

FIGS. 11A to 11C are plan views which are useful in explaining the operation of the actuating lever of the parking lock-releasing device, in which FIG. 11A shows a state before the locking is released, FIG. 11B shows a state after the locking is released, and FIG. 11C shows a state in which the actuator releases the locked state by the parking mechanism; and FIGS. 12A and 12B are views which are useful in explaining the operation of the locking release operation section, in which FIG. 12A shows a state before the locking is released, and FIG. 12B shows a state after the locking is released.

DETAILED DESCRIPTION OF PREFERRED EMBODIMENTS

Figure 1:
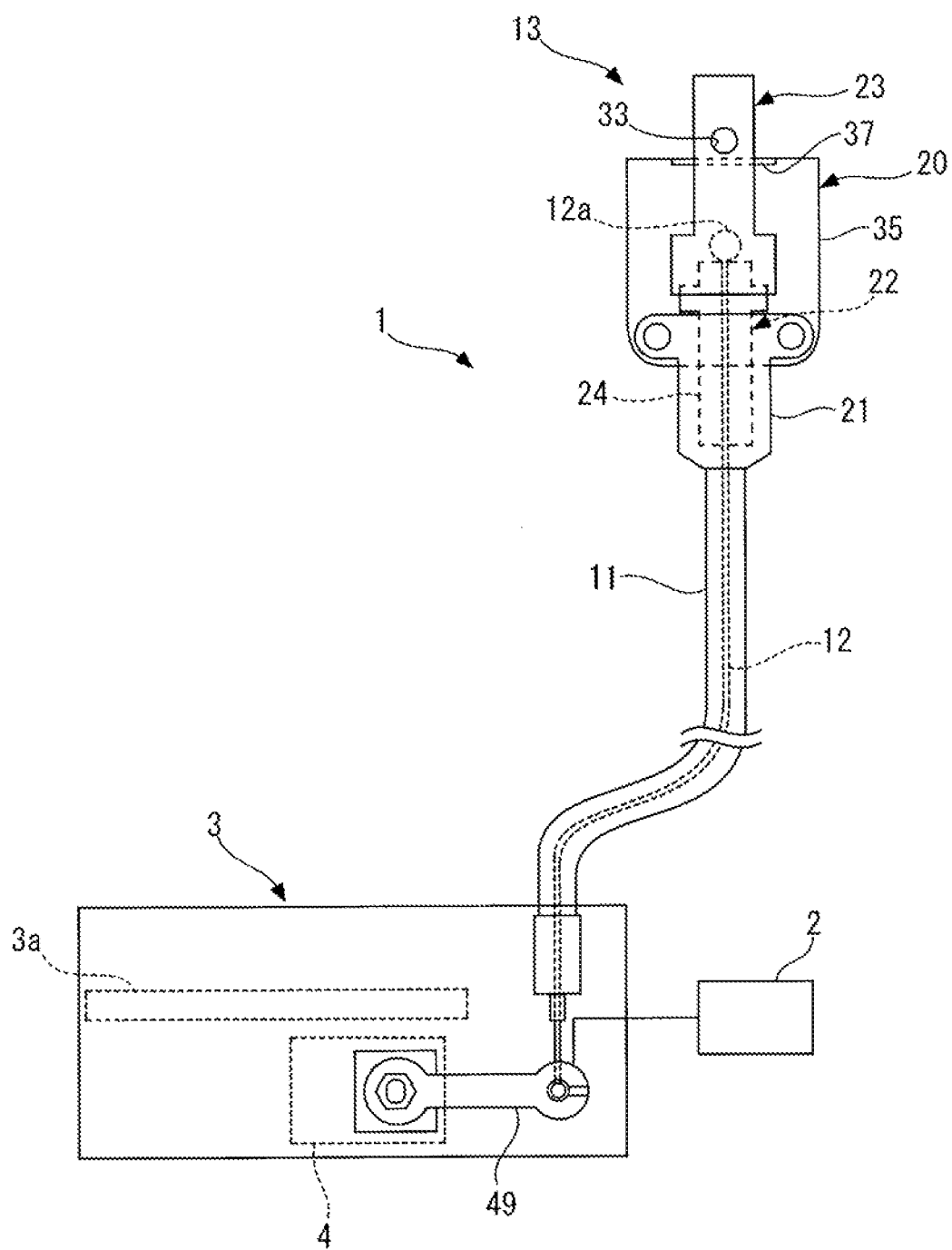
FIG. 1 is a diagram showing a parking lock-releasing device for a vehicle, according to a first embodiment of the present invention, together with a schematic illustration of a transmission.

The present invention will now be described in detail with reference to the drawings showing preferred embodiments thereof. FIG. 1 shows a parking lock-releasing device for a vehicle, according to a first embodiment of the present invention, together with a schematic illustration of a transmission. A vehicle (not shown) to which is applied the parking lock-releasing device 1 includes a transmission 3 that is actuated by an electric or hydraulic actuator 2, and has a so-called shift-by-wire system applied thereto. Further, in the transmission 3, when the shift range is switched to a parking range, an output shaft 3a of the transmission 3 is unrotatably locked by a parking mechanism 4 which is actuated by the actuator 2. In such a parking locked state, when the actuator 2 is in an inoperable state, the parking lock-releasing device 1 is used for manually releasing the parking lock.

The parking lock-releasing device 1 includes an outer casing 11 that extends in a long slender cylindrical shape and having flexibility, an inner cable 12, long and slender, which is formed e.g. by metallic wire material and is accommodated in the outer casing 11 in a manner slidable along the direction of length thereof, and a locking release operation section 13 that is provided at a front end of the outer casing 11, i.e. an end of the same remote from the parking mechanism 4, and is operated when releasing the parking lock. The locking release operation section 13 is provided at a predetermined location in the vehicle, such as in an engine room or near the driver's seat.

Figure 2:
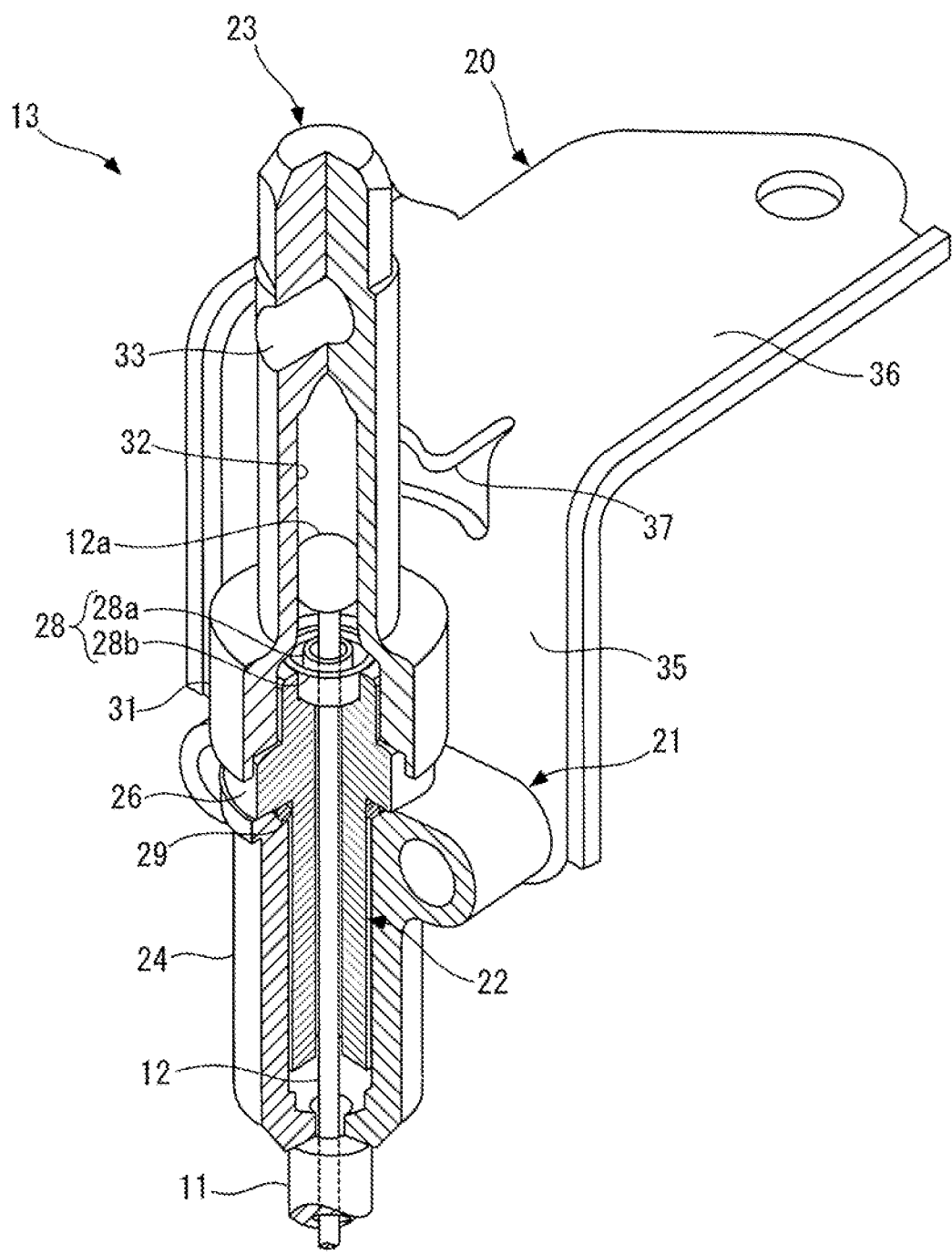
FIG. 2 is an enlarged perspective view, partially cut away, of a locking release operation section of the parking lock-releasing device.
Figure 3:
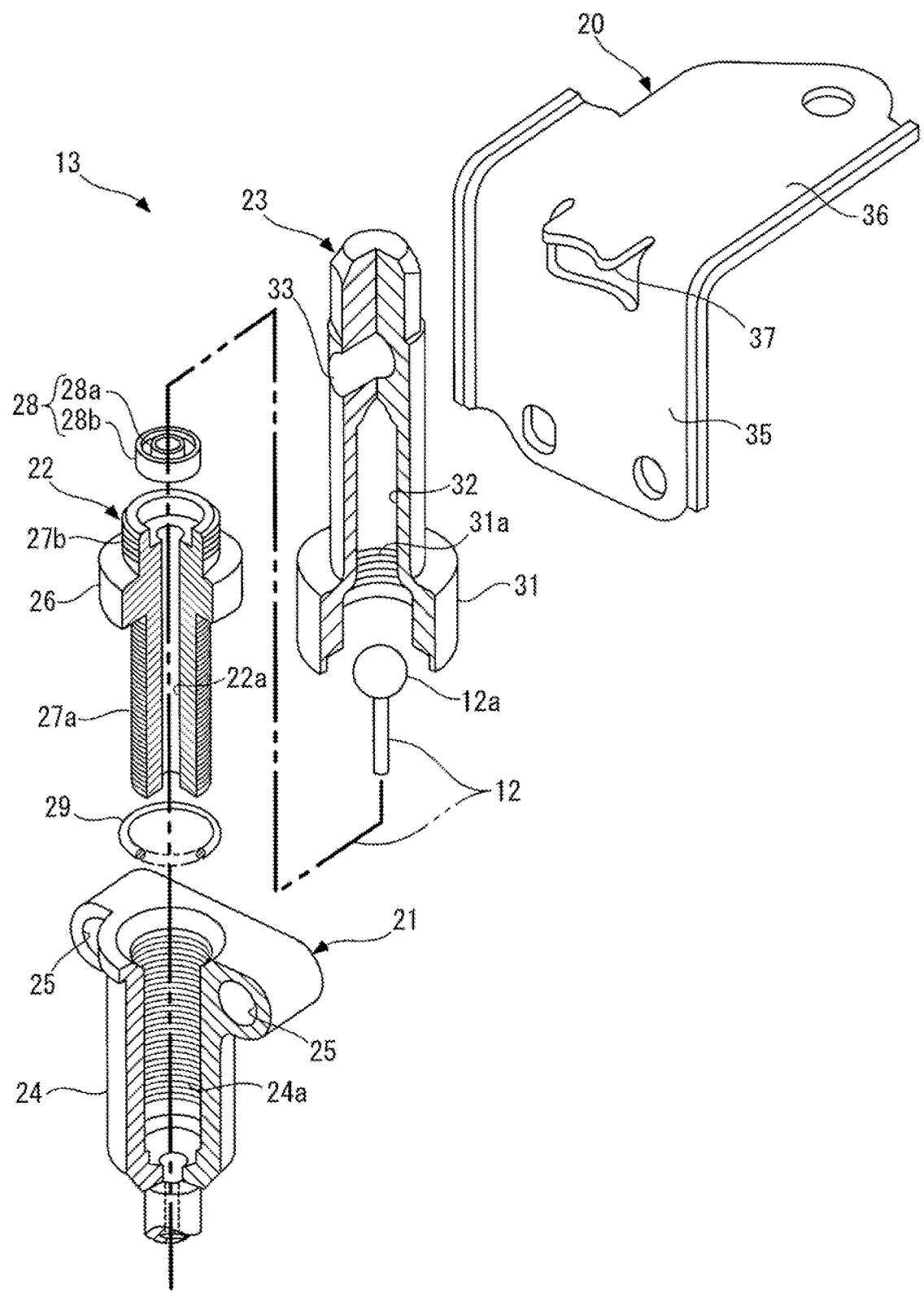
FIG. 3 is an exploded perspective view of the locking release operation section shown in FIG. 2.

As shown in FIGS. 2 and 3, the locking release operation section 13 includes a base 21 that is provided in a manner continuous with the front end of the outer casing 11 and is attached to a predetermined position in the vehicle via a bracket 20 L-shaped in side view, a cable holder 22 that is attached to the base 21 in a state screwed therein and holds the front end of the inner cable 12, and an operating cover 23 (cover) that is attached to the cable holder 22 in a manner covering the front end (upper end shown in FIGS. 2 and 3) of the cable holder 22 and is rotatingly operated when the parking lock is released.

The base 21 is concentrically continuous with the outer casing 11, and includes a guide portion 24 formed in a cylindrical shape having a predetermined diameter and length. The guide portion 24 has a female screw 24a formed on an inner peripheral surface thereof. Further, the guide portion 24 of the base 21 has upper end formed such that the diameter thereof progressively increases upward. Further, the base 21 has an upper end provided with two mounting holes 25 and 25 on lateral opposite sides of the guide portion 24, and the base 21 is screwed to the bracket 20 via the mounting holes 25.

The cable holder 22 extends over a predetermined length concentrically with the guide portion 24 of the base 21 and is formed circular in transverse cross section, with a through hole 22a formed in a central portion in a manner extending along the length thereof, for having the inner cable 12 inserted therein. Further, a flange portion 26 having a diameter larger than the inner diameter of the guide portion 24 of the base 21 is provided at an upper portion of the cable holder 22. A male screw 27a is formed on an outer peripheral surface of the cable holder 22 downward of the flange portion 26, for being screwed into the female screw 24a of the guide portion 24 of the base 21. Also, a male screw 27b is formed on an outer peripheral surface of the cable holder 22 upward of the flange portion 26, for being screwed into a female screw 31a of the operating cover 23, described hereinafter. Further, a bearing 28 (relative rotation holding part) formed by an inner ring 28a and an outer ring 28b that are relatively rotatable to each other is attached to the upper end of the cable holder 22 in a state in which the bearing 28 is concentrically fitted in the cable holder 22.

The cable holder 22 constructed as above is connected to the base 21 in a state in which the cable holder 22 is screwed into the guide portion 24 of the base 21 from above, as shown in FIG. 2. Further, in this case, a gasket 29 which is formed by an O ring made of rubber is placed between an upper end of the guide portion 24 of the base 21 and a lower surface of the flange 26 of the cable holder 22, so that a space between the guide portion 24 of the base 21 and the flange portion 26 of the cable holder 22 is water-tightly sealed.

Further, the inner cable 12 is inserted not only through the through hole 22a of the cable holder 22 but also through the inner ring 28a of the bearing 28. In addition, the inner cable 12 has an increased-diameter portion provided at the front end thereof, which has a ball shape larger in diameter than the through hole 22 of the cable holder 22 and the inner ring 28a of the bearing 28. With this, the inner cable 12 is held without coming off from the cable holder 22.

The operating cover 23 is configured to extend upward from the front end of the cable holder 22 over a predetermined length concentrically with the cable holder 22. A base portion 31 which is a lower end of the operating cover 23 is formed such that the outer diameter thereof is larger than that of the other portions of the cover 23. The operating cover 23 has a hollow portion 32 formed therein which is open toward the base portion 31 and has a predetermined diameter and length. The hollow portion 32 is formed such that the diameter thereof is slightly larger than that of the increased-diameter portion 12a of the inner cable 12. Further, the female screw 31a which can be screwed onto the male screw 27b on the upper side of the cable holder 22 is formed on an inner peripheral surface of the base portion 31. Further, the operating cover 23 has an upper end formed to have a regular hexagonal shape in transverse cross-section, and a tool insertion hole 33 to which a tool, such as a screwdriver, can be inserted, extends through the upper end of the operating cover 23 in a direction orthogonal to the direction of the length of the operating cover 23.

The operating cover 23 constructed as above is integrally connected to the cable holder 22 in a state in which the base portion 31 is screwed onto the upper end of the cable holder 22 and swaged thereto. Therefore, when the operating cover 23 is rotatingly operated about its axis, the cable holder 22 is rotated along with the operating cover 23. In the present embodiment, an operating section body is formed by the cable holder 22 and the operating cover 23.

The bracket 20 is formed in an L shape in side view, as mentioned hereinabove, e.g. by bending a metal plate having a predetermined shape, and includes a base fixing portion 35 to which the base 21 of the locking release operation section 13 is screwed, and a bracket fixing portion 36 for screwing the bracket 20 itself inside the vehicle. Further, the bracket 20 is provided with a stopper 37 which is flush with the bracket fixing portion 36, and is cut and raised from the base fixing portion 35 in a manner protruding toward the operating cover 23.

Figure 4:
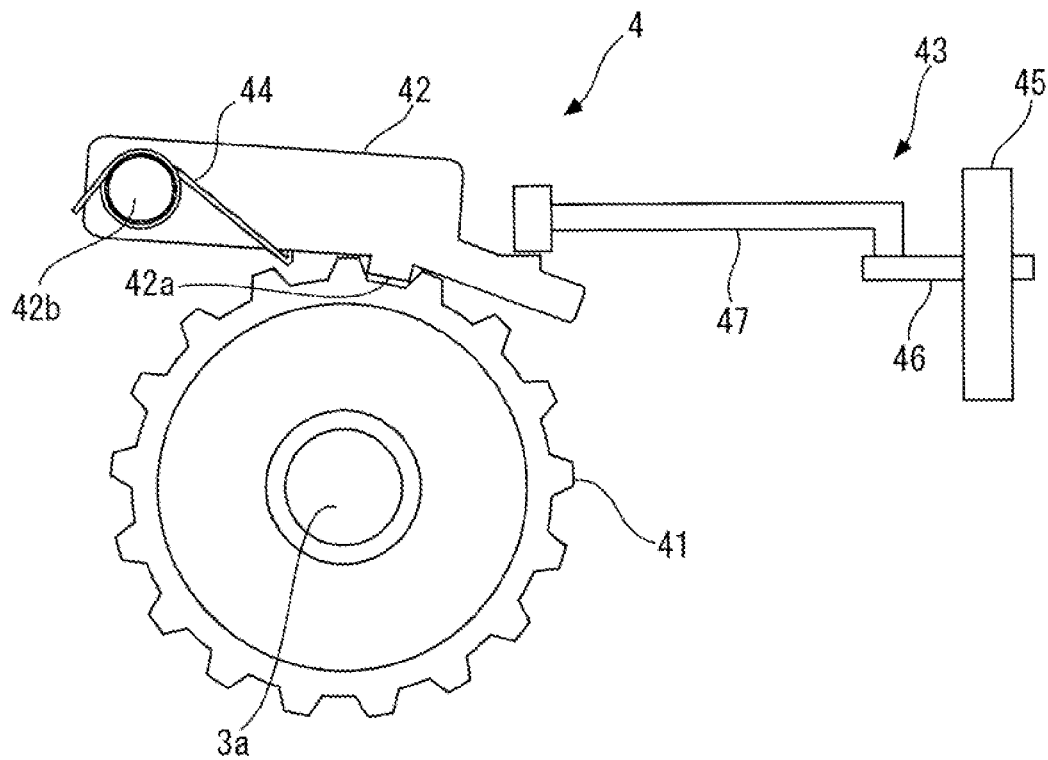
FIG. 4 is a view of a parking mechanism.

FIG. 4 shows the parking mechanism 4. As shown in FIG. 4, the parking mechanism 4 includes a parking gear 41 configured to be rotatable and be spline-fitted to the output shaft 3a of the transmission 3, a parking pawl 42 configured to be meshable with the parking gear 41, and a pawl actuating mechanism 43 for actuating the parking pawl 42. The parking pawl 42 has a locking pawl 42a meshable with the parking gear 41, and is configured to be pivotally movable about a fulcrum part 42b. Further, the fulcrum part 42b of the parking pawl 42 is provided with a torsion spring 44 for urging the parking pawl 42 in a direction in which meshing of the locking pawl 42a with the parking gear 41 is released.

Figure 5:
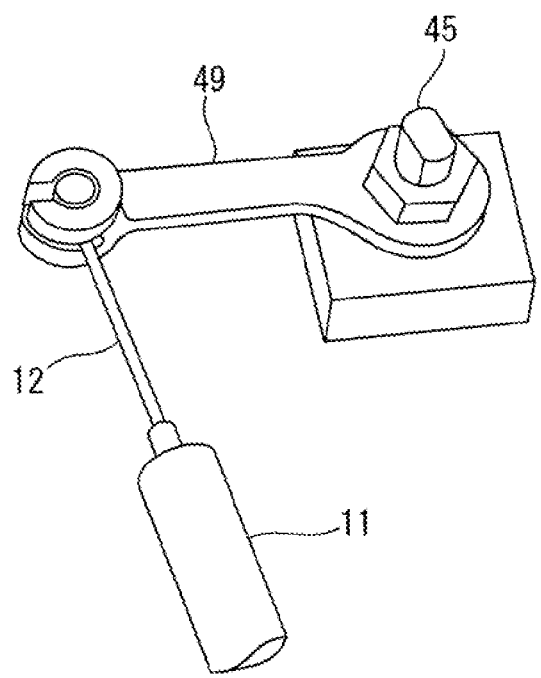
FIG. 5 is a perspective view of an actuating lever for actuating the parking mechanism and a connection part of an inner cable.

The pawl actuating mechanism 43 is comprised of an actuating shaft 45 which protrudes out of the transmission 3 and is pivotally movable, a cam 46 which is fixed on the actuating shaft 45 and has an engaging groove (not shown) having a predetermined shape, and a slider 47 which is provided in a manner extending between the parking pawl 42 and the cam 46, and has one end thereof brought into contact with the parking pawl 42 and the other end there brought into engagement with the engaging groove of the cam 46. Further, as shown in FIG. 5, a portion of the actuating shaft 45 protruding out of the transmission 3 has fixed thereto one end of an actuating lever 49 having a predetermined length. Then, the inner cable 12 is connected to the other end of the actuating lever 49.

Figure 7A:
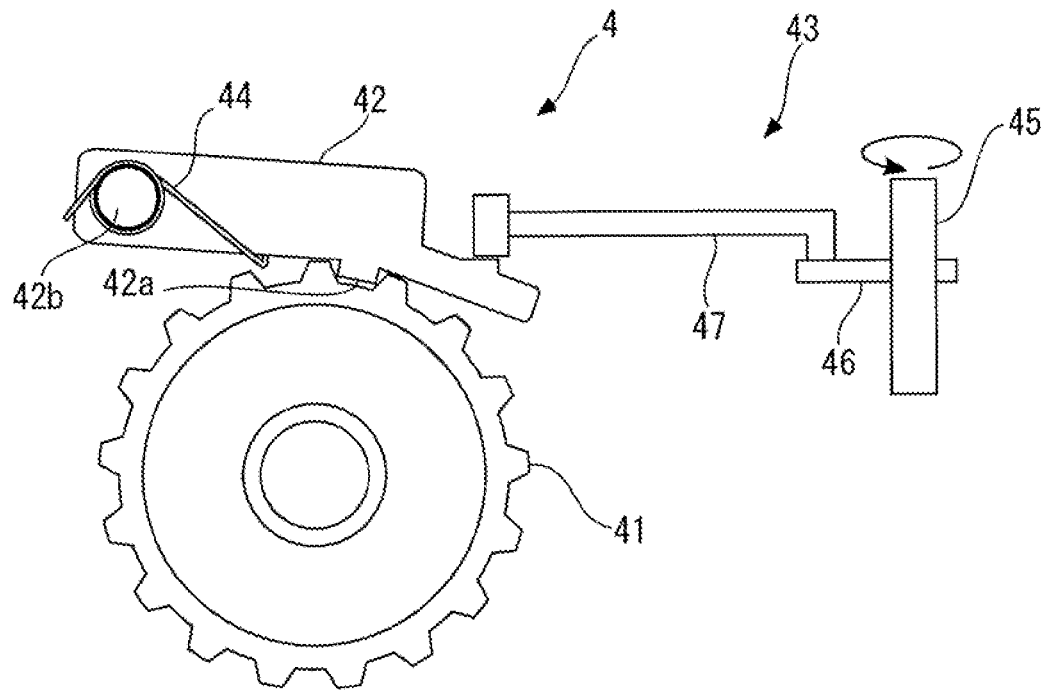
FIG. 7A shows a locked state of the parking mechanism.

Next, a method of releasing locking by the parking mechanism 4 by the parking lock-releasing device 1 will be described with reference to FIGS. 6A to 6C and FIGS. 7A and 7B. FIG. 6A shows the locking release operation section 13 before the locking is released. In this case, in the parking mechanism 4, as shown in FIG. 7A, the locking pawl 42a of the parking pawl 42 is engaged with the parking gear 41, whereby the output shaft 3a of the transmission 3 is unrotatably locked.

From the state described above, when releasing the parking lock, first, the operator inserts a rod-shaped tool (e.g. screwdriver) into the tool insertion hole 33 of the operating cover 23 of the locking release operation section 13, or fits a tool, such as a wheel wrench, on the upper end of the operating cover 23. Then, by using the tool, the operator rotating operates the operating cover 23 in a direction opposite to a screw-in direction, relative to the guide portion 24 of the base 21. The operating cover 23 is thereby rotated in unison with the cable holder 22 connected thereto, and is moved upward as shown in FIG. 6B. Accordingly, the increased-diameter portion 12a of the inner cable 12 is also moved upward together with the operating cover 23 and the cable holder 22. As a result, the inner cable 12 is slid in the outer casing 11 by being pulled, to thereby pivotally move the operating lever 49 through a predetermined angle.

Figure 7B:
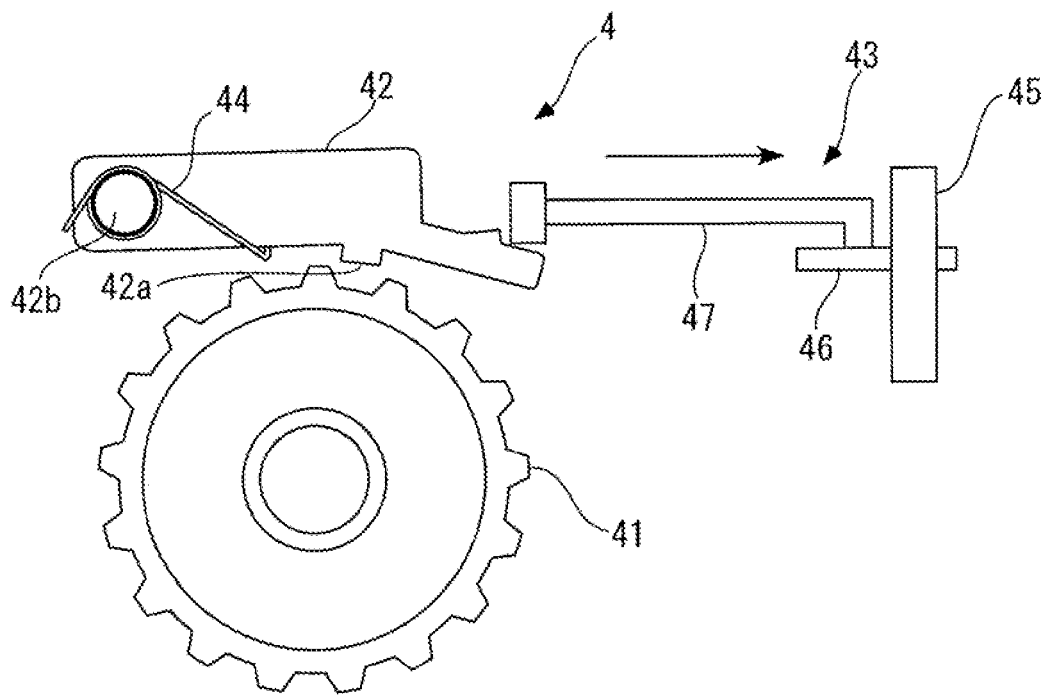
FIG. 7B shows a state in which the locked state by the parking mechanism is released.

In this case, in the parking mechanism 4, the actuating shaft 45 is pivotally moved through the predetermined angle, and the cam 46 is pivotally moved in unison therewith through the predetermined angle. Then, as shown in FIG. 7B, the slider 47 of the pawl actuating mechanism 43 is moved in an arrow direction shown in FIG. 7B, whereby the parking pawl 42 is pivotally moved by the urging force of the torsion spring 44, to cause the locking pawl 42a to be disengaged from the parking gear 41. As a result, the parking lock is released.

Note that in a case where the inner cable 12 is slid in the outer casing 11 as the parking mechanism 4 is actuated by the actuator 2, the increased-diameter portion 12a of the inner cable 12 is allowed to move in the hollow portion 32 of the operating cover 23, as shown in FIG. 6C. This makes it possible to cause the inner cable 12 to smoothly slide without being compressed or deflected.

As described above, according to the present embodiment, when manually releasing the parking lock, it is possible to easily release the parking lock only by rotating the operating cover 23 of the locking release operation section 13 in a direction opposite to the screw-in direction and thereby pulling out the cable holder 22 by a predetermined stroke. Further, the parking mechanism 4 is configured to act in a locking direction by the urging force of spring or the like, so that even in a case where the inner cable 12 is pulled toward the parking mechanism 4, the cable holder 22 screwed to the guide portion 24 of the base 21 is immovable back or forth unless it is rotatingly operated, and hence even when the operator releases the hand from the locking release operation section 13, it is possible to easily hold the parking mechanism 4 in the locking released state. Further, the through hole 22a of the cable holder 22 and the increased-diameter portion 12a of the inner cable 12 are covered by the operating cover 23, and the space between the guide portion 24 of the base 21 and the cable holder 22 are sealed with the gasket 29. This makes it possible to ensure the sealing performance of the front end of the outer casing 11, whereby it is possible prevent water from entering the outer casing 11 to thereby effectively prevent the inner cable 12 from suffering from rust and like damage. As described above, according to the present embodiment, it is possible to improve workability in manually releasing the parking lock while ensuring sealing performance of the front end of the outer casing 11, and easily hold the locking released state.

Further, the bearing 28 is provided between the cable holder 22 and the increased-diameter portion 12a of the inner cable 12, and hence even when the cable holder 22 is rotatingly operated when releasing the parking lock, the inner cable 12 is not rotated together with the cable holder 22, which makes it possible to prevent the inner cable 12 from being twisted.

Further, in the case of releasing the parking lock, the operating cover 23 is pulled out while being rotatingly operated, by a predetermined stroke with respect to the base 21, until the base portion 31 of the operating cover 23 abuts against the stopper 37 of the bracket 20, whereby the operating cover 23 cannot be further rotated. By providing the stopper 37 in a manner well positioned enough to release the parking lock by rotation of the operating cover 23, the operator can positively release the parking lock by rotatingly operating the operating cover 23 until the base portion 31 thereof abuts against the stopper 37. Further, after releasing the parking lock, when the releasing of the parking lock becomes unnecessary, by rotating the operating cover 23 in a direction opposite to the lock releasing direction, it is possible to easily return the operating cover 23 and the cable holder 22 to their original positions, that is, the positions in which the locking by the parking lock mechanism 4 is performed.

Next, a second embodiment of the present invention will be described with reference to FIGS. 8 to 12B. Note that in the following description, the same components as those of the above-described first embodiment are denoted by the same reference numerals, and detailed description thereof is omitted.

Figure 8:
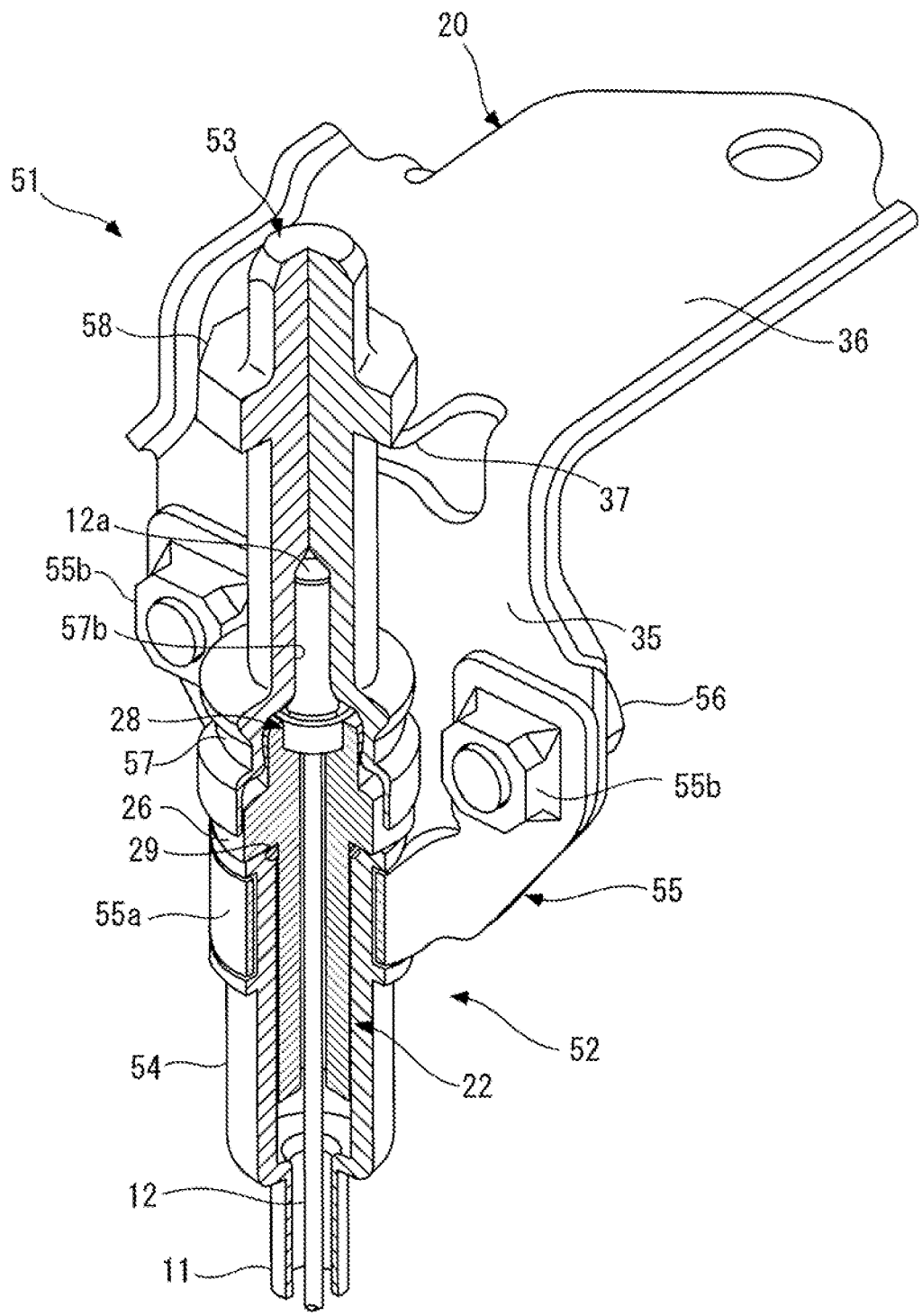
FIG. 8 is an enlarged perspective view, partially cut away, of a locking release operation section of a parking lock-releasing device for a vehicle, according to a second embodiment of the present invention.
Figure 9:
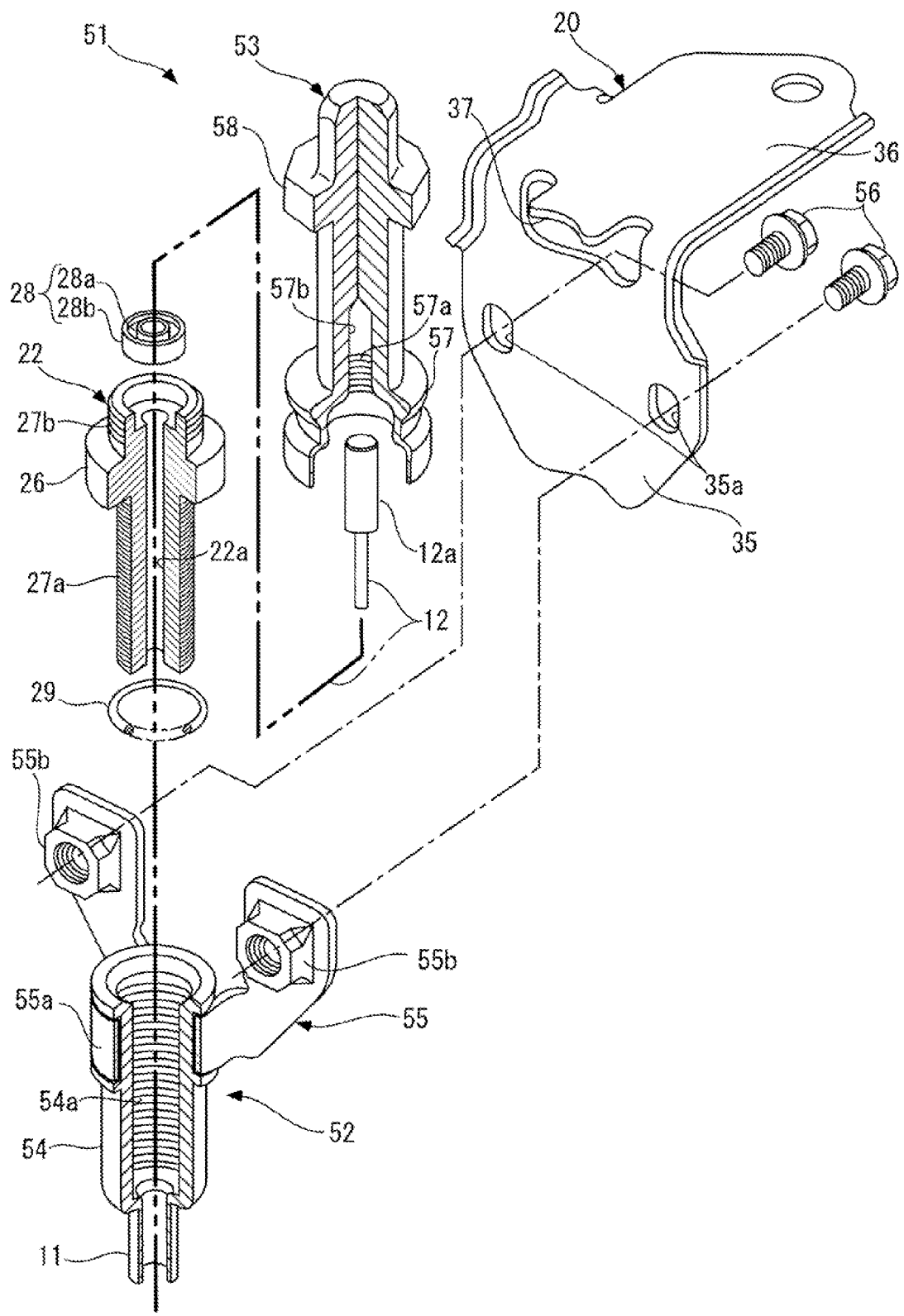
FIG. 9 is an exploded perspective view of the locking release operation section shown in FIG. 8.

FIGS. 8 and 9 show a locking release operation section 51 of the parking lock-releasing device 1 according to the second embodiment. As shown in FIGS. 8 and 9, the locking release operation section 51 includes not only a base 52 and an operating cover 53 which have functions similar to those of the base 21 and the operating cover 23 of the locking release operation section 13 according to the first embodiment, respectively, but also the cable holder 22 which is identical with the one of the locking release operation section 13 of the first embodiment.

The base 52 has a guide 54 formed in a cylindrical shape having predetermined diameter and length, and has a female screw 54a formed on the inner peripheral surface thereof. Further, the base 52 is screwed to the bracket 20 which is similar to the one of the first embodiment, via a mounting member 55. The mounting member 55 is formed in a V shape in front view, and has a base fixing portion 55a formed in a central portion thereof, for having an upper portion of the base 52 fixed thereto. The base fixing portion 55a is formed in a ring shape in plan view, and has the guide 54 fixed thereto by welding, in a state in which the guide 54 is inserted into the inside thereof. Further, nuts 55b and 55b are fixed to respective right and left upper ends of the mounting member 55, by welding, concentrically with respective through holes (not shown) each having a predetermined diameter.

As shown in FIG. 8, similarly to the first embodiment, the cable holder 22 is connected to the base 52 in a manner screwed into the guide 54 of the base 52 from above. Further, the base 52 is fixed to the bracket 20 by screwing bolts 56 and 56 into the right and left nuts 55b and 55b of the mounting member 55, in a state in which the right and left nuts 55b and 55b match the right and left mounting holes 35a and 35a formed in the base fixing portion 35 of the bracket 20, respectively.

The operating cover 53 is configured to extend upward from the front end of the cable holder 22 over a predetermined length concentrically therewith, and a female screw 57a meshable with the male screw 27b on an upper portion of the cable holder 22 is formed on an inner peripheral surface of a base portion 57 which is a lower end of the operating cover 53. Further, in the operating cover 53, there is formed a hollow portion 57b extending upward from the base portion 57 over a predetermined length for accommodating the increased-diameter portion 12a of the front end of the inner cable 12. Further, at an upper portion of the operating cover 53, there is provided a tool engaging portion 58 which is formed to have a regular hexagonal shape, in transverse cross-section, with a predetermined size, and can be engaged with a tool, such as a wheel wrench. In the present embodiment, the increased-diameter portion 12a provided at the front end of the inner cable 12 is formed in a columnar shape which has almost the same length as the length of the hollow portion 57b of the operating cover 53.

Figure 10:
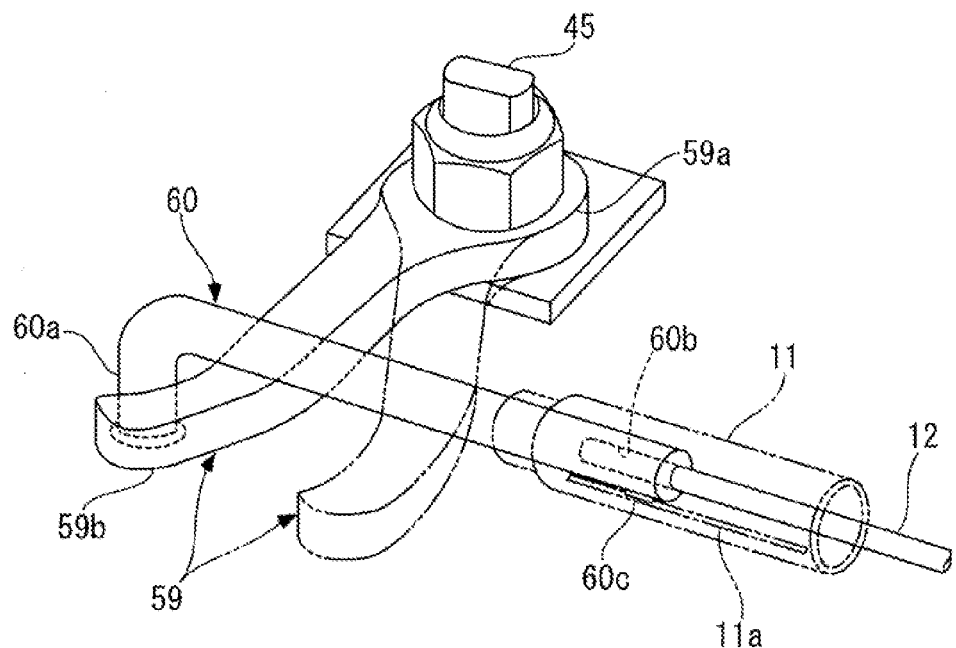
FIG. 10 is a perspective view of an actuating lever for actuating the parking mechanism and a connection part of an inner cable.

FIG. 10 shows an actuating lever 59 having a function similar to that of the actuating lever 49 of the above-described first embodiment, and an engaging portion engaging with the inner cable 12. As shown in FIG. 10, the actuating lever 59 (lock lever) according to the present embodiment, which is made of metal, has a predetermined thickness and is formed into a predetermined shape. Specifically, the actuating lever 59 is configured to extend like an arm over a predetermined length from a base portion 59a having a substantially circular shape in plan view, and have a front end 59b thereof formed into a bent shape. Further, the base portion 59a of the actuating lever 59 is fixed to the actuating shaft 45 similarly to the actuating lever 49 of the first embodiment. Then, the actuating lever 59 is configured to be pivotally movable between a locking position (indicated by solid lines in FIG. 10) to be positioned when the locking by the parking mechanism 4 is achieved and a locking release position (indicated by two-dot chains line in FIG. 10) to be positioned when the locking is released, using the base portion 59a integrally formed with the actuating shaft 45 as a fulcrum.

Further, as shown in FIG. 10, the inner cable 12 has an end provided with an actuating rod 60 (lever engaging portion) which protrudes from the outer casing 11 and can be engaged with and disengaged from the actuating lever 59 for actuating the actuating lever 59. The actuating rod 60 is formed by a round rod of metal having a predetermined diameter and length, and is formed into a predetermined shape. Specifically, the actuating rod 60 has a front end 60a bent approximately at right angles and extending somewhat longer than the thickness of the actuating lever 59, and has a rear end having a body of the inner cable fixed thereto by swaging in a state in which the body of the inner cable 12 is inserted into a cable retaining hole 60b. In addition, the rear end of the actuating rod 60 is provided with a protrusion 60c protruding in a radial direction. The protrusion 60c is slidably engaged with a guide groove 11a formed in an inner peripheral surface of the outer casing 11 in a manner extending along a direction of the length thereof.

The actuating rod 60 constructed as above is disposed in a manner crossing the actuating lever 59, and is configured to be linearly moved between a standby position (shown in FIGS. 11A and 11C) for engaging with the front end 59b of the actuating lever 59 in a state in contact with or in contiguity therewith, and a lever actuating position (shown in FIG. 11B) for actuating the actuating lever 59 to the locking release position by being pulled toward the outer casing 11. Note that when the actuating rod 60 is moved from the standby position to the lever actuating position, the protrusion 60c of the actuating rod 60 moves along the guide groove 11a of the outer casing 11 while being guided thereby. This enables the front end 60a of the actuating rod 60 to stably actuate the actuating lever 59 to the locking release position without being changed in the bending direction thereof, while holding a state in contact with the front end 59b of the actuating lever 59.

Figure 11A:
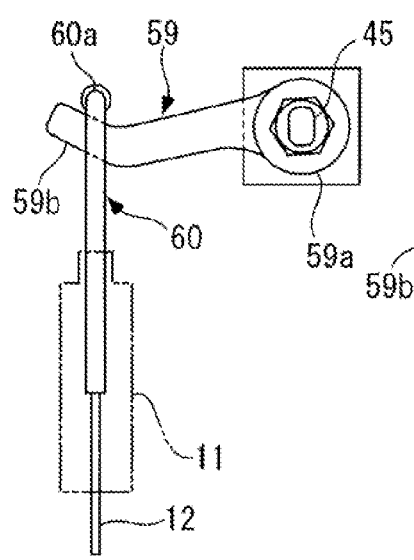

Next, a method of releasing locking by the parking mechanism 4 by the parking lock-releasing device 1 will be described with reference to FIGS. 11A to 11C and FIGS. 12A and 12B. FIG. 11A shows engaged portions of the actuating lever 59 and the actuating rod 60 of the inner cable 12 in a locked state of the parking mechanism 4, in plan view. In this state, the actuating lever 59 is positioned at the locking position, whereas the actuating rod 60 is positioned at the standby position. Further, in this case, in the locking release operation section 51, the cable holder 22 is in a state screwed in the guide 54 of the base 52, as shown in FIG. 12A.

Figure 11B:
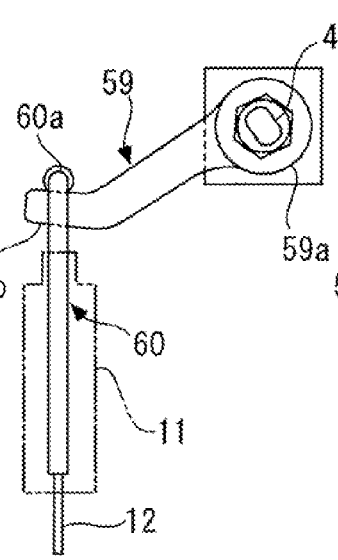

When releasing the parking lock from the above state, first, the operator fits a tool, such as a wheel wrench, from above on the operating cover 53 of the locking release operation section 51 such that the tool is engaged with the tool engaging portion 58 of the operating cover 53. Then, by using the tool, the operator rotatingly operates the operating cover 53 relative to the base 52 in a direction opposite to the screw-in direction. This causes the operating cover 53 to move upward while being rotated in unison with the cable holder 22 connected thereto, as shown in FIG. 12B, and accordingly, the increased-diameter portion 12a of the inner cable 12 is moved upward together with the operating cover 53 and the cable holder 22. Consequently, the inner cable 12 is slid in the outer casing 11 while being pulled, so that the actuating rod 60 is moved to the lever actuating position, as shown in FIG. 11B. Accordingly, the actuating rod 60 rotates the actuating lever 59 to the locking release position, whereby the parking lock is released.

Figure 11C:
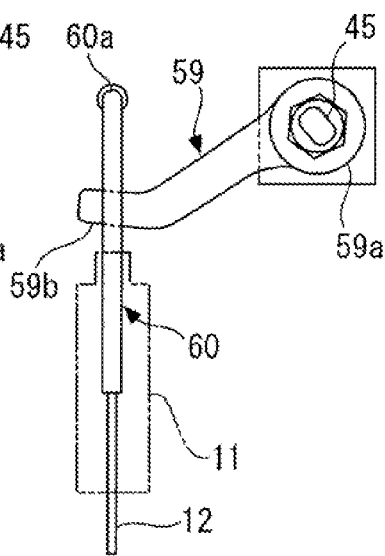

Further, in a case where when the actuating rod 60 of the inner cable 12 is in the standby position, actuation of the parking mechanism 4 by the actuator 2 causes the actuating lever 59 to be pivotally moved from the locking position to the locking release position, the actuating rod 60 remains in the standby position as shown in FIG. 11C since the locking release operation section 51 is not operated, so that the actuating lever 59 leaves the front end 60a of the actuating rod 60. That is, even though the parking mechanism 4 is actuated by the actuator 2, the inner cable 12 is not slid in the outer casing 11.

Thus, according to the present embodiment, similarly to the first embodiment described above, it is possible to not only improve workability in manually releasing the parking lock but also easily hold the locking released state. Further, with the parking lock-releasing device 1 according to the present embodiment, compared with a case where whenever the parking mechanism 4 performs locking and releasing the locking, the inner cable 12 is slid inside the outer casing 11 according to the locking and the releasing by the parking mechanism 4, it is possible to prolong the service life of the present device and stably use the same. Further, when the actuator 2 actuates the parking mechanism 4, power for sliding the inner cable 12 is not required and load due to the sliding does not act on the actuator 2, and hence compared with a case where the inner cable 12 is always connected to the parking mechanism 4, it is possible to reduce actuating force of the actuator 2 on the parking mechanism 4, and ensure positive and stable operations of the actuator 2.

Note that the present invention is by no means limited to the embodiments described above, but it can be practiced in various forms. For example, although in the present embodiments, the cable holder 22 for holding the front end of the inner cable 12, and the operating covers 23 and 53 attached in a manner covering the front end of the inner cable 12 are formed as separate parts, they may be formed as a single part insofar as it is possible to ensure the sealing performance of the front end of the outer casing 11 and hold the front end of the inner cable 12. Further, in the first embodiment, a detachable cap may be attached to the front end of the operating cover 23 such that the cap covers the tool insertion hole 33 so as to prevent the tool insertion hole 33 from being blocked with dust or corrosion. Further, the detailed construction of the parking lock-releasing device 1 in the above-described embodiments are given by way of example, and they can be modified, as desired, insofar as it does not depart from the subject matter of the present invention.

It is further understood by those skilled in the art that the foregoing are preferred embodiments of the invention, and that various changes and modifications may be made without departing from the spirit and scope thereof.

What is claimed is:

1. A parking lock-releasing device for a vehicle in which a parking mechanism actuated by an electric or hydraulic actuator unrotatably locks an output shaft of a transmission, the parking lock-releasing device being for manually releasing locking by the parking mechanism, comprising:
    an outer casing having an elongated hollow cylindrical shape;
    an inner cable accommodated in the outer casing such that the inner cable extends along a direction of length of the outer casing in a slidable manner, one end of the inner cable engaged with the parking mechanism; and
    a locking release operation section provided at a front end that is an end of the outer casing remote from the parking mechanism, for pulling the inner cable in a direction opposite to a direction toward the parking mechanism when manually releasing the locking,
    wherein the locking release operation section comprises:
        a base that has a guide portion having a hollow cylindrical shape and concentrically continuous with the front end of the outer casing, the guide portion having a female screw formed on an inner peripheral surface thereof; and
        an operating section body screwed via a male screw formed on an outer peripheral surface thereof into the female screw of the guide portion and also closes the guide portion, the operating section body holding another end of the inner cable, and when releasing the locking, being rotatingly operated in a predetermined direction relative to the base, to thereby cause the inner cable to slide such that the inner cable is pulled in the direction opposite to the direction toward the parking mechanism,
    wherein the operating section body comprises:
        a cable holder configured to extend concentrically with the guide portion over a predetermined length, and hold the other end of the inner cable in a state inserted in a through hole which extends along a direction of length of the cable holder, the cable holder having the male screw formed on an outer peripheral surface thereof; and
        a cover attached to the cable holder, in a state covering the front end of the cable holder and the other end of the inner cable,
    wherein an extremity of the other end of the inner cable is provided with an increased-diameter portion having a larger diameter than a diameter of the through hole of the cable holder, and
    wherein the operating section body further comprises a relative rotation holding section provided between the cable holder and the increased-diameter portion of the inner cable, for holding the cable holder and the inner cable in a state rotatable relative to each other.

2. The parking lock-releasing device according to claim 1, wherein the cover is configured to extend outward from the cable holder over a predetermined length concentrically with the cable holder, and includes a hollow portion which allows movement of the increased-diameter portion when the inner cable is slid along with actuation of the parking mechanism by the actuator.

3. The parking lock-releasing device according to claim 2, wherein the cover is attached to the cable holder in a relatively unrotatable state, and
    wherein the cover is provided with a tool insertion hole extending through the cover in a direction orthogonal to a direction of length of the cover, for rotatingly operating the cable holder in unison with the cover, in a state having the tool inserted therein.

4. The parking lock-releasing device according to claim 1, wherein the locking release operation section further comprises a stopper for disabling rotating operation of the operating section body by abutment of the operating section body against the stopper when the operating section body is pulled out while being rotated by a predetermined stroke with respect to the base.

5. The parking lock-releasing device according to claim 1, wherein the parking mechanism comprises a lock lever provided, outside the transmission, in a manner extending like an arm from a base portion, the lock lever being configured to be pivotally movable using the base portion as a fulcrum, between a locking position to be positioned at the time of the locking and a locking release position at which the locking is released, wherein the one end of the inner cable is provided with a lever engagement portion which can be engaged with and disengaged from a front end of the lock lever, and wherein the lever engagement portion is configured to be linearly moved between a standby position in which the lever engagement portion is engaged with the lock lever in the locking position, and is on standby in a state in which the locking release operation section is not operated, and a lever actuating position in which the lever engagement portion actuates the lock lever to the locking release position by the locking release operation section being operated.

\* \* \* \* \*